(12) United States Patent
Lee et al.

(10) Patent No.: US 10,486,647 B2
(45) Date of Patent: Nov. 26, 2019

(54) VEHICLE AND METHOD FOR CONTROLLING THEREOF

(71) Applicants: HYUNDAI MOTOR COMPANY, Seoul (KR); KIA MOTORS CORPORATION, Seoul (KR)

(72) Inventors: Jihye Lee, Sokcho-si (KR); Dong June Song, Anyang-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 15/996,838

(22) Filed: Jun. 4, 2018

(65) Prior Publication Data
US 2019/0248333 A1    Aug. 15, 2019

(30) Foreign Application Priority Data

Feb. 14, 2018    (KR) .................. 10-2018-0018388

(51) Int. Cl.
*B60R 25/24*    (2013.01)
*B60R 25/25*    (2013.01)
*G06K 9/00*    (2006.01)

(52) U.S. Cl.
CPC .......... *B60R 25/246* (2013.01); *B60R 25/252* (2013.01); *B60R 25/255* (2013.01); *G06K 9/001* (2013.01)

(58) Field of Classification Search
CPC .......... G06F 21/32; G06F 21/34; G06F 21/83; G06F 21/35; G06F 1/1684; G06F 21/31; G06F 21/45; G06F 21/6245; G06F 2203/04106; G06F 2221/2107
USPC ........................................................ 340/5.53
See application file for complete search history.

(56) References Cited

U.S. PATENT DOCUMENTS

| | | | | |
|---|---|---|---|---|
| 7,404,086 | B2* | 7/2008 | Sands | G06F 21/32 713/186 |
| 8,234,220 | B2* | 7/2012 | Weiss | G06F 21/32 705/68 |
| 9,712,524 | B2* | 7/2017 | Chang | H04L 63/0861 |
| 9,838,388 | B2* | 12/2017 | Mather | H04L 63/0861 |
| 2007/0198436 | A1* | 8/2007 | Weiss | G06F 21/32 705/75 |
| 2016/0224773 | A1* | 8/2016 | Ramaci | G06F 21/6245 |
| 2018/0109947 | A1* | 4/2018 | Kim | H04L 63/0435 |

* cited by examiner

*Primary Examiner* — Mark S Blouin
(74) *Attorney, Agent, or Firm* — Brinks Gilson & Lione

(57) ABSTRACT

A vehicle may include a detector to detect and obtain biometric information, a first storage to store encrypted user biometric information, a second storage to store identification information of a user, and a first controller to decrypt the encrypted user biometric information when the detector detects the encrypted user biometric information based on the identification information received from the second storage. The first controller authenticates the user based on whether the detected biometric information is identical to the decrypted user biometric information.

18 Claims, 8 Drawing Sheets

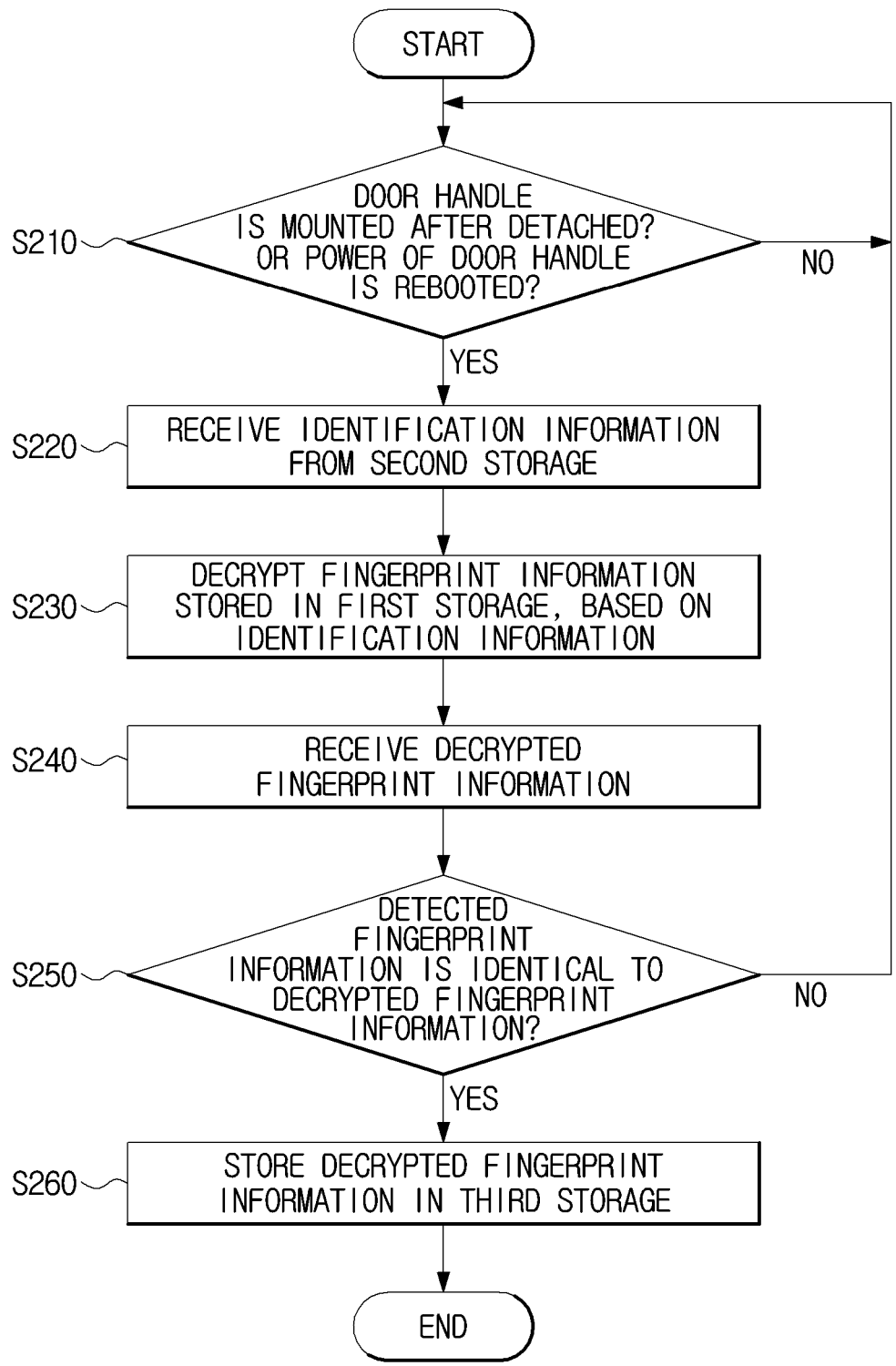

VEHICLE AND METHOD FOR CONTROLLING THEREOF

CROSS-REFERENCE TO RELATED APPLICATION

This application claims priority to and the benefit of Korean Patent Application No. 10-2018-0018388, filed on Feb. 14, 2018, which is incorporated by reference herein in its entirety.

FIELD

The present disclosure relate to a vehicle and a method for controlling thereof, more particularly, to a technology capable of identifying a user.

BACKGROUND

The statements in this section merely provide background information related to the present disclosure and may not constitute prior art.

In modern society, automobiles are the most common means of transportation and the number of people using them has been increased. Due to advances in automotive technology, there are many changes in life such as facilitating the long-distance movement, and making life easier, than in the past.

As for the vehicle, a variety of electronics such as a hands-free device, a GPS receiver, a Bluetooth device, and high-pass device has been developed for the convenience of the driver. Among the automotive technology fields, electric and electronic fields are increasingly creating the new value.

Also, in recent years, there is trend in the car-sharing in which a number of people shares vehicles and for the car-sharing, a user authentication process is desired to inhibit or prevent the vehicle theft.

The user authentication technique is mainly performed a primitive authentication method in which an authentication device receives a password from a user through a keypad and matches the password with a pre-stored password, thereby authenticating a user. However, in recent years, due to the development of scientific technology, technologies for identifying or authenticating users using biologic features such as gene traits, fingerprints, voices, veins, facial features, and irises have come into commercial use for more accurate authentication.

Among these methods, a method of using biometric information of the user such as user's fingerprint may be most frequently used as the authentication method.

The authentication method of using biometric information is performed such that a user stores user biometric information in a vehicle or a server in advance, and when the user wants to use the vehicle, user biometric information detected by the vehicle is matched with the biometric information stored in the server, thereby completing the user authentication.

But, in forms of the above mentioned method, since the authentication process is performed by matching biometric information received from the vehicle with biometric information stored in the server by a one-to-one method, it may be possible to quickly transmit a result of the authentication process when a server does not have a lot of user information. However, we have discovered that when the server has a lot of user information, it may take a large amount of time to perform the authentication process.

We have also discovered that when fingerprint authentication process is performed in a state in which fingerprint information is stored in a vehicle door, there may be problems caused by the door handle theft

SUMMARY

The present disclosure provides a vehicle capable of reducing a period of time for fingerprint authentication by using a non-volatile memory and a volatile memory, and capable of inhibiting or preventing the vehicle theft caused by detachment of a door handle.

In accordance with one aspect of the present disclosure, a vehicle includes a detector configured to detect and obtain biometric information, a first storage configured to store encrypted user biometric information, a second storage configured to store identification information of a user, and a first controller, when the detector detects the encrypted user biometric information, configured to decrypt the encrypted user biometric information, which is encrypted and stored in the first storage, based on the identification information received from the second storage. In particular, the first controller is configured to authenticate the user based on whether the detected biometric information is identical to the decrypted user biometric information.

The biometric information may include at least one of fingerprint information, iris information or face information of the user.

The identification information may include an encryption key.

The first controller may obtain a singularity from detected user fingerprint information and identify or determine whether the obtained singularity is identical to decrypted fingerprint information.

The first storage may include a non-volatile memory.

When a door of the vehicle is mounted after detached, or when a power state of the door connected to the vehicle is changed, the first controller may authenticate the user.

When the power state of the door is switched from an Off state to an On state, the first controller may authenticate the user.

The detector may be provided on at least one of an ignition button, a Fob key, a door handle, a center fascia, or a steering wheel of the vehicle.

The vehicle may further include a second controller configured to control an operation of the vehicle. The second controller may give the user an authority to control the vehicle when the detected biometric information is identical to the decrypted biometric information.

The vehicle may further include a third storage provided with a volatile memory. The first controller may store the user biometric information in the third storage when the detected biometric information is identical to the decrypted user biometric information.

When the detector detects biometric information after first controller stores the user biometric information in the third storage, the first controller may authenticate the user based on whether the detected biometric information is identical to the user biometric information stored in the third storage.

In one form of the present disclosure, a control method of a vehicle includes the steps of: storing encrypted user biometric information in a first storage; storing identification information of a user in a second storage; detecting and obtaining, by a detector, biometric information; when the encrypted user biometric information is detected, decrypting, by a first controller, the encrypted user biometric information, which is encrypted and stored in the first storage, based on the identification information received from the second storage; and authenticating, by the first controller, the user based on whether the detected biometric information is identical to the decrypted user biometric information.

The biometric information may include at least one of fingerprint information, iris information or face information of the user.

The identification information may include an encryption key.

The authentication of the user may include: obtaining a singularity from detected user fingerprint information; and determining whether the detected user fingerprint information is identical to decrypted fingerprint information based on the obtained singularity.

The first storage may include a non-volatile memory.

The authentication of the user may include authenticating the user when a door of the vehicle is mounted after detached, or when a power state of the door connected to the vehicle is changed.

The authentication of the user may include authenticating the user when the power state of the door is switched from an Off state to an On state.

The detection may include performing a detection by using at least one of an ignition button, a Fob key, a door handle, a center fascia, or a steering wheel of the vehicle.

The control method may further include giving, by a second controller, the user an authority to control the vehicle when the detected biometric information is identical to the decrypted user biometric information.

Additional aspects of the present disclosure will be set forth in part in the description which follows and, in part, will be obvious from the description, or may be learned by practice of the present disclosure.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which:

FIG. 8 is a flowchart illustrating a control method of a vehicle.

Figure 1:
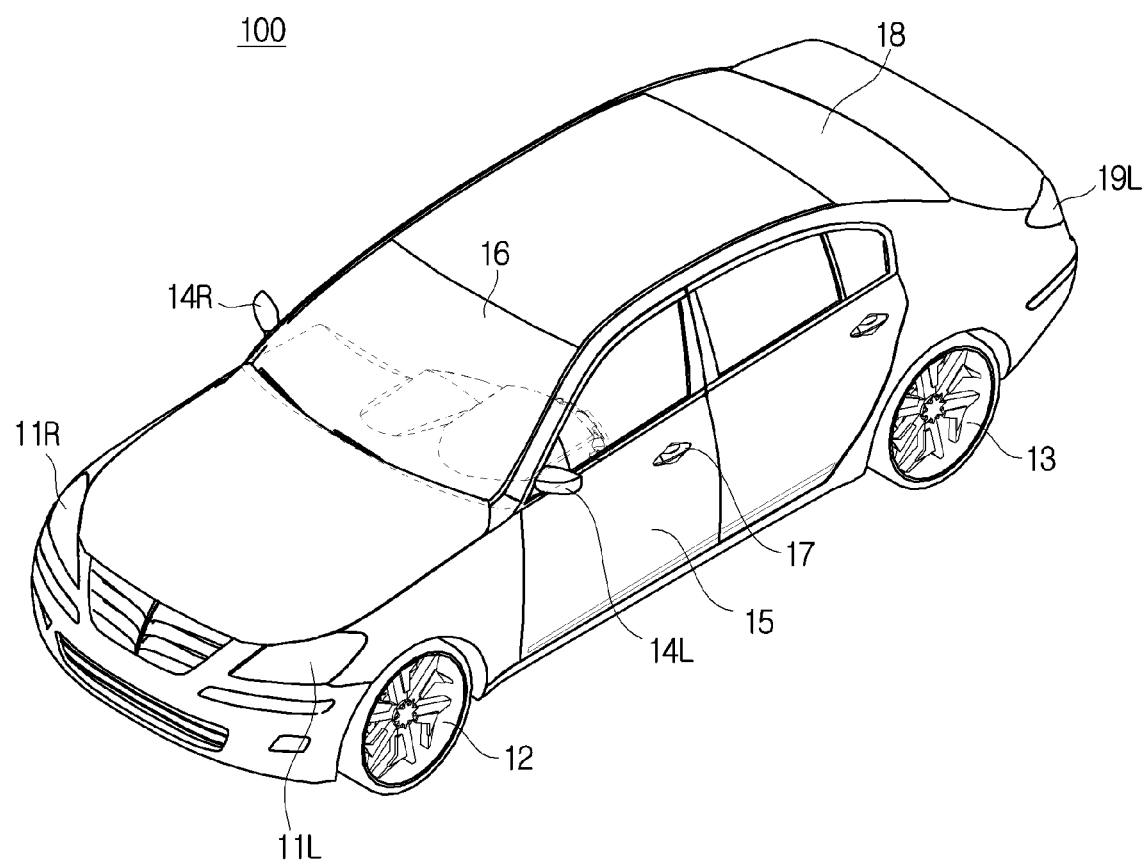
FIG. 1 is a view illustrating an external appearance of a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Forms described in the present disclosure may be modified in various different ways at the time of filing of the present application to replace the forms and drawings of the present disclosure.

Also, the terms used herein are used to describe the forms and are not intended to limit and/or restrict the present disclosure. The singular forms "a," "an" and "the" are intended to include the plural forms as well, unless the context clearly indicates otherwise.

In this present disclosure, the terms "including", "having", and the like are used to specify features, numbers, steps, operations, elements, components, or combinations thereof, but do not preclude the presence or addition of one or more of the features, elements, steps, operations, elements, components, or combinations thereof. It will be understood that, although the terms first, second, third, etc., may be used herein to describe various elements, but elements are not limited by these terms. These terms are only used to distinguish one element from another element. For example, without departing from the scope of the present disclosure, a first element may be termed as a second element, and a second element may be termed as a first element.

In the description of the present disclosure, if it is determined that a detailed description of commonly-used technologies or structures related to the forms of the present disclosure may unnecessarily obscure the subject matter of the present disclosure, the detailed description will be omitted.

Hereinafter a vehicle 100 in one form represents a hybrid vehicle, but is not limited thereto. Thus, forms may be applied to another type vehicle.

Figure 2:
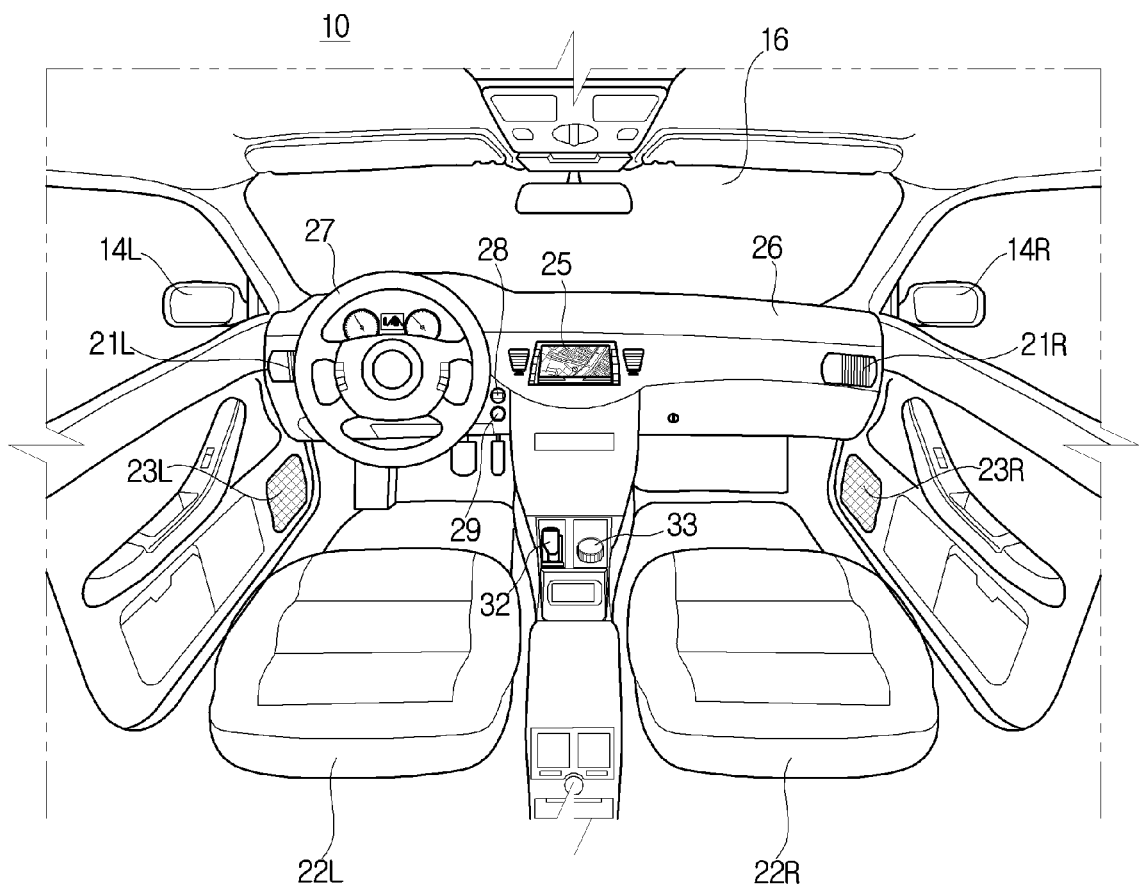
FIG. 2 is a view illustrating an internal appearance of the vehicle.

FIG. 1 is a view illustrating an external appearance of a vehicle 100 in one form, and FIG. 2 is a view illustrating an internal appearance of the vehicle 100 in one form. Hereinafter, a description of the same contents will be described together to prevent duplication.

Referring to FIG. 1, in one form of the present disclosure, an exterior of the vehicle 100 may include vehicle wheels 12 and 13 moving the vehicle 100, a door 15 closing the inside of the vehicle 100 from the outside, a front glass 16 providing a front view of the vehicle 100 to a driver inside the vehicle 100, and side mirrors 14L and 14R providing a view of a rear side of the vehicle 100 to the driver.

The vehicle wheels 12 and 13 may include a front wheel 12 provided on a front of the vehicle 100 and a rear wheel 13 provided on a rear of the vehicle 100. Although not shown, the vehicle 100 may include a transmission configured to convert power to a torque according to a speed and transmit the torque, and an engine configured to generate the power by burning fuel.

The door 15 may be rotatably provided on a right side and a left side of the vehicle 100. When the door is opened, a driver may be allowed to be seated in the vehicle 100, and when the door is closed, the inside of the vehicle 100 may be closed from the outside. In the outside of the vehicle 100, a handle 17 configured to open and close the door 15 may be provided.

The front glass 16 may be provided on an upper portion of the front of the body to allow a driver inside the vehicle 100 to acquire visual information about the front of the vehicle 100 and the rear glass 18 may be provided on an upper portion of the rear of the body to allow a driver inside the vehicle 100 to acquire visual information about the rear of the vehicle 100.

The side mirrors 14L and 14R may include a left side mirror 14L provided on the left side of the vehicle 100 and a right side mirror 14R provided on the right side of the vehicle 100, and may allow a driver inside the vehicle 100 to acquire visual information of the lateral side and the rear side of the vehicle 100.

In addition, a headlight 11L and 11R configured to secure a view ahead of the vehicle 100 may be provided in the front left and right side of the vehicle 100.

In addition, the vehicle 100 may include a sensor configured to detect an obstacle and another vehicle in the rear or lateral side. The sensor may include a detector e. g. a proximity sensor and a rain sensor configured to detect whether to rain and an amount of rain.

The proximity sensor may transmit a detection signal to the lateral side or rear side of the vehicle, and receive a reflection signal reflected from an obstacle such as another vehicle. Based on waveform of the received signal, the proximity sensor may detect whether an obstacle is present in the rear or lateral side of the vehicle 100, and a position in which an obstacle is placed. As an example of such a proximity sensor, a method of transmitting ultrasound or infrared rays and detecting a distance to an obstacle by using ultrasound waves or infrared rays reflected by obstacles may be employed.

Referring to FIG. 2, in the center area of a dashboard 26, an audio video navigation (AVN) terminal 25 configured to display a video or an image may be provided. The AVN terminal 25 may selectively display at least one of an audio screen, a video screen, and a navigation screen, as well as a screen related to various control screens or additional functions related to the vehicle 100.

A jog shuttle type-center input 33 may be provided between the driver seat 22 L and the passenger seat 22 R. A user may input a control command by rotating, pressing the center input 33 or pushing the center input 33 in the up, down, left, or right direction. In addition, a gear stick 32 configured to control a level of a transmission 140 may be provided adjacent to the center input 33.

The vehicle 100 may include a speaker 23 configured to output a sound. The speakers 23 may output a desired sound to perform an audio function, a video function, a navigation function and other additional functions.

FIG. 2 illustrates that the speaker 23 is provided in the driver seat 22 L and the passenger seat 22 R, respectively, but is not limited thereto. Therefore, the speaker 23 may be disposed on a variety of positions.

On the dashboard 26 on the side of the driver seat 22L, a steering wheel 27 may be disposed. In a position adjacent to the steering wheel 27, a key hole 28 to which a remote controller (not shown) e.g., a FOB key, is inserted, may be provided. When a remote controller configured to turn on/off an ignition of the vehicle is inserted into the key hole 28 or when an authentication between the remote controller and the vehicle 100 is completed through a wireless communication network, an external terminal and the vehicle 100 may be connected to each other.

On the dashboard 26, an ignition button 29 configured to control of turning on and off of the vehicle 100 may be provided. When the remote controller is inserted into the key hole 28 or when an authentication between the remote controller and the vehicle 100 is successful through a wireless communication network, it may be possible to turn on the ignition of the vehicle 100 by pressing the ignition button 29 by a user.

In addition, an air conditioning apparatus may be provided in the vehicle 100 and thus heating and cooling may be performed. The air conditioning apparatus may control an internal temperature of the vehicle 100 by discharging heated or cooled air through an air outlet 21.

FIG. 2 illustrates that the air outlet 21 is provided in the driver seat 22 L and the passenger seat 22 R, respectively, but is not limited thereto. Therefore, the air outlet 21 may be disposed on a variety of positions.

Figure 3:
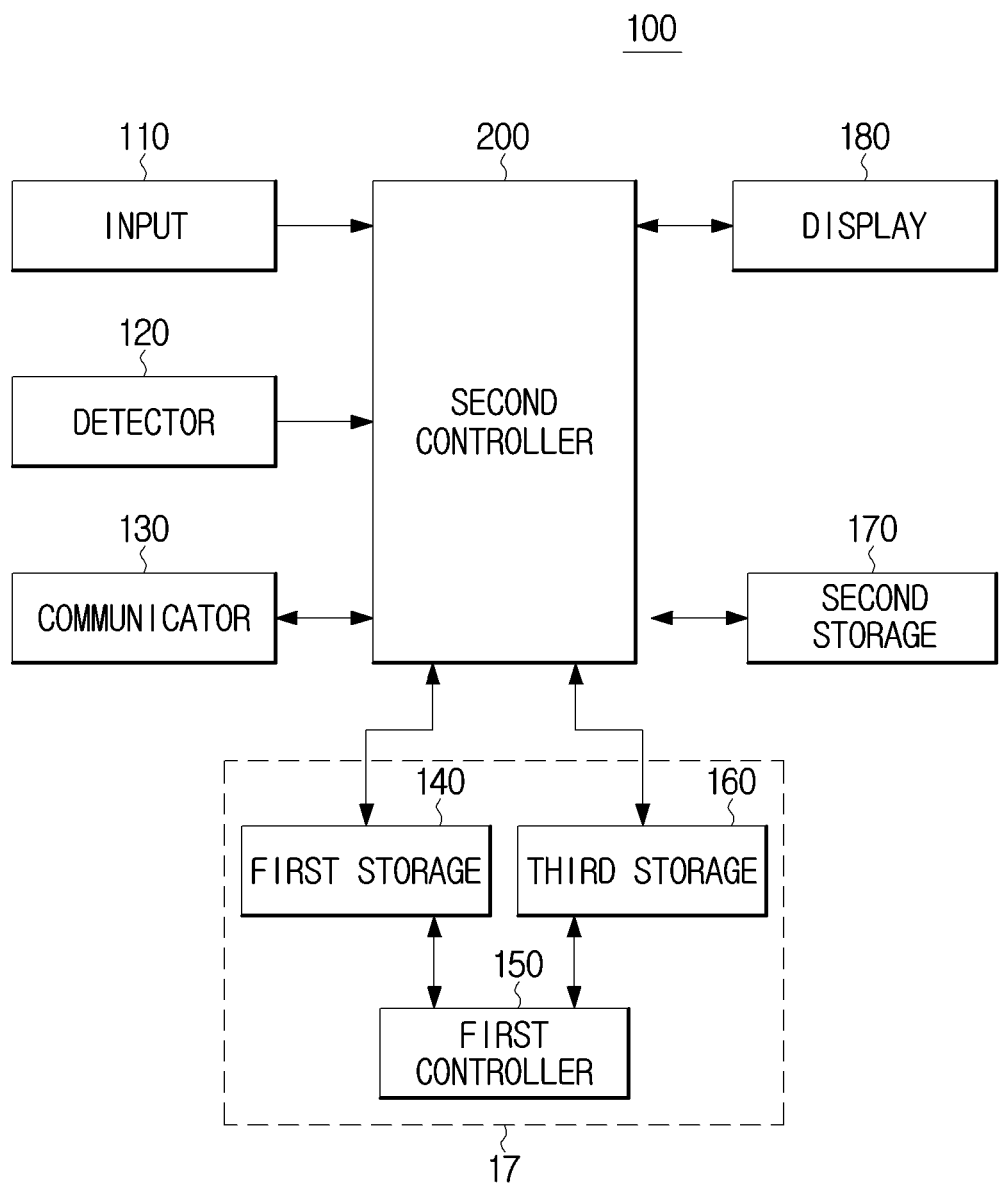
FIG. 3 is a block diagram illustrating a part of a configuration of the vehicle.
Figure 4:
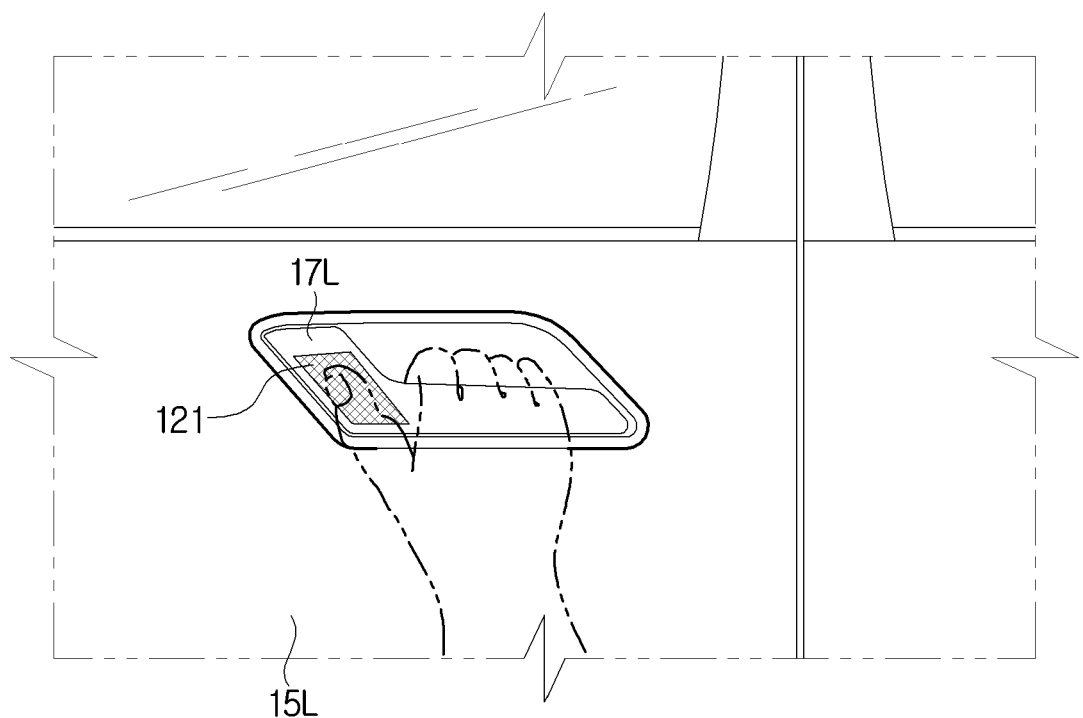
FIGS. 4 and 5 are views illustrating a variety of positions in which an input and a detector are provided.
Figure 5:
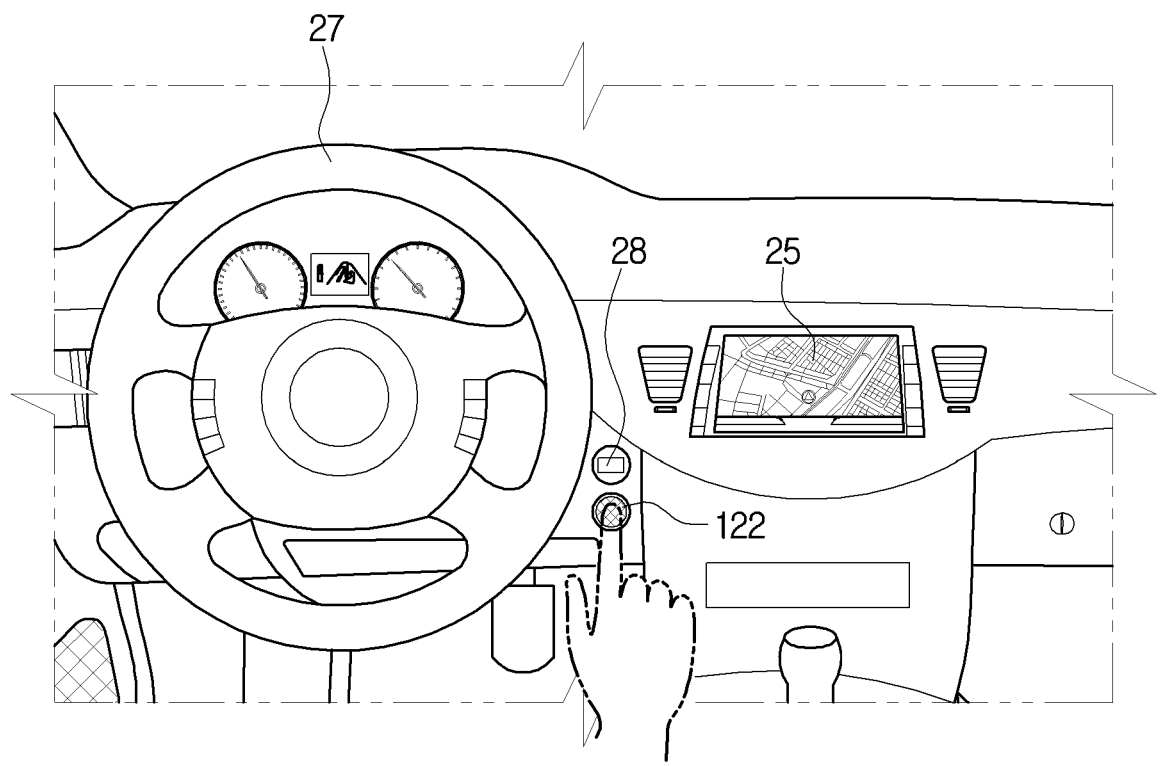
Figure 6:
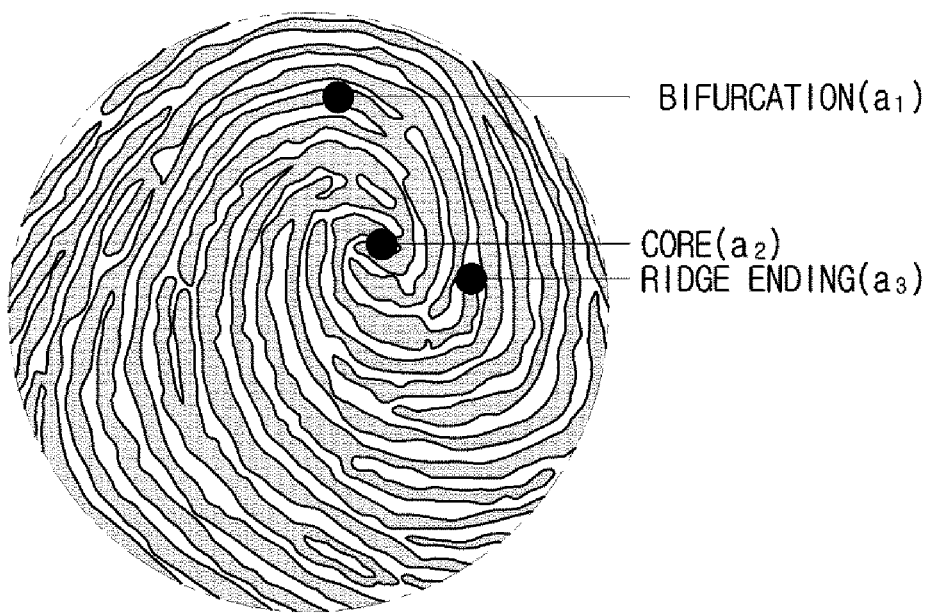
FIG. 6 is a view illustrating a case in which a singularity is obtained from fingerprint information.

FIG. 3 is a block diagram illustrating a part of a configuration of the vehicle 100 in one form of the present disclosure, and FIGS. 4 and 5 are views illustrating a variety of positions in which an input 110 and a detector 120 are provided in one form of the present disclosure. FIG. 6 is a view illustrating a case in which a singularity is obtained from fingerprint information in one form of the present disclosure.

Referring to FIG. 3, the vehicle 100 may include an input 110 configured to receive a variety of commands from a user, an detector 120 configured to detect and obtain user's biometric information, a communicator 130 configured to receive user's biometric information from an external server, a second storage 170 to which user identification information is stored, a display 180 on which user's biometric information is displayed, a second controller 200 configured to control an operation of the vehicle 100 and to control a variety of devices inside of the vehicle 100, a first storage 140 and a third storage 160 in which user's biometric information is stored, and a first controller 150 configured to perform a user authentication process. In particular, the first storage 140, the third storage 160, and the first controller 150 may be provided in the door handle 17, as illustrated in FIG. 3.

The input 110 may receive various commands related to vehicle control from a user. Particularly, when a user intends to store biometric information and authentication information, in the vehicle 100, the user may store the information through the input 110.

The detector 120 may detect user biometric information and when detecting the biometric information, the detector 120 may obtain the detected user biometric information.

Particularly, the detector 120 may detect user biometric information through a sensor installed in various positions in the inside or the outside of the vehicle 100, and when detecting the user biometric information, the detector 120 may transmit the detected biometric information, to the second controller 200.

For convenience of description, the user biometric information is described with fingerprints as examples, but is not limited thereto. Alternatively, gene features, voices, veins, facial information, and iris information that illustrate biological features may be included in the biometric information.

The detector 120 may include a variety of devices configured to detect and obtain user biometric information. For example, the detector 120 may include a fingerprint sensor configured to obtain user's fingerprint, and a face or an eye ball sensor configured to obtain user's face information, but is not limited thereto.

Alternatively, a sensor provided in the vehicle 100 is not limited thereto, and thus a device capable of obtaining user biometric information may be provided as a component of the detector 120.

The sensor may be provided at various positions inside or outside the vehicle 100. As illustrated in FIG. 4, a sensor 121 may be disposed on one side of the door handle 17L to detect and obtain user's biometric information. Alternatively, a sensor 122 may be disposed on the ignition button 29 of the vehicle 100, as illustrated in FIG. 5.

Generally, a user touches the handle 17 and the ignition button 29 to use the vehicle 100. Therefore, in one form, the vehicle 100 may be provided with the sensor disposed on the handle 17 and the ignition button 29 so as to more easily detect and obtain user biometric information.

The positions of the sensor shown in FIGS. 4 and 5 are merely examples and thus positions are not limited thereto. The sensor may be provided on at least one of the Fob key, the dashboard 26, the steering wheel 27 and the center fascia of the vehicle 100.

When the user biometric information and the identification information is not stored in the vehicle 100, the communicator 130 may receive the user biometric information from the external server.

The communicator 130 may perform a communication with an external server through a variety of methods. Particularly, the communicator 130 may transmit and receive information to and from an external server through a variety of methods such as radio frequency (RF), wireless fidelity (Wi-Fi), Bluetooth, Zigbee, near field communication (NFC), and Ultra-Wide Band (UWB), but the communication method is not limited thereto. Therefore, a communication method as long as capable of communicating with an external server may be applied.

The storage 140, 160, and 170 may store at least one of the user's biometric information and identification information.

Particularly, the first storage 140 may be provided in the door handle 17 and store the user biometric information, wherein the biometric information may be encrypted. Therefore, in order to obtain the biometric information stored in the first storage 140, identification information may be needed to decrypt the encryption.

The first storage 140 may include a non-volatile memory element such as flash memory, in which information is not erased although power is not supplied. Therefore, although the door 15 is re-mounted after being detached, or the power connected to the door 15 is turned on after turned off, the user biometric information stored in the first storage 140 may be not deleted.

However, when the door 15 is detached in a state in which the first storage 140 includes a flash memory, there may be a risk of leakage of the biometric information. Therefore, according to one form, when the door 15 is detached or when a power state of the door 15 is changed, the vehicle 100 may receive identification information from the second storage 170 disposed inside the body of the vehicle 100, and perform a user authentication process based on the received identification information. A detail description thereof will be described with reference to FIG. 8.

The second storage 170 may be provided inside the vehicle 100, and store the user biometric information and identification information. The identification information may be needed to obtain the biometric information stored in the first storage, wherein the identification information may include information such as an encryption key.

In other words, since the biometric information stored in the first storage 140 is encrypted, the first controller 150 may receive the encryption key from the second storage 170 and decrypt the encryption information stored in the first storage 140, based on the received encryption key.

The second storage 170 may be implemented using at least one of a cache, a Read Only Memory (ROM), a Programmable ROM (PROM), an Erasable Programmable ROM (EPROM), an Electrically Erasable Programmable ROM (EEPROM) and a flash memory, a volatile memory element, or a storage medium, e.g., a Hard Disk Drive (HDD) or a CD-ROM. The implementation of the storage is not limited thereto.

The third storage 160 may be provided on the door handle 17, and store the user biometric information. Particularly, when the user authentication is completed by the second controller 200, it may be identified that the user has an authority to use the vehicle 100, and thus the first controller 150 may store the detected user information in the third storage 160.

The user who has been authenticated is authorized to continue using the vehicle 100, and thus when the biometric information is detected by the detector 120 after the completion of the authentication, the first controller 150 may perform the user authentication process based on the detected biometric information, and the biometric information stored in the third storage 160.

However, when the door 15 is re-mounted after being detached, or when the power connected to the door 15 is turned off, there may be a risk of the leakage of the biometric information caused by the vehicle theft. To inhibit or prevent this, the biometric information stored in the third storage 160 may be deleted.

Particularly, when fingerprint information is remained in the door 15 after the door 15 is detached from the vehicle 100, there may be a risk of the vehicle theft in that the door 15 having the fingerprint information is mounted to another vehicle. Therefore, when the door 15 is detached from the vehicle 100, the biometric information stored in the third storage 160 may be deleted by the first controller 150.

Therefore, the third storage 160 may include a volatile memory element, in which information is detected when the power is turned off. For example, the third storage 160 may include a random access memory (RAM).

The display 180 may display various information related to the user's biometric information. When a user wants to store biometric information in the vehicle 100, the display 180 may display information related to a storage procedure. In addition, when the display 180 is implemented as a touch screen display panel, the display 180 may serve as the input 110 and the detector 120 at the same time.

The display 180 may include a display panel (not shown) to display information, wherein the display panel may be implemented by Cathode Ray Tube (CRT), Liquid Crystal Display (LCD) panel, Light Emitting Diode (LED) panel or Organic Light Emitting Diode (OLED) panel, Plasma Display Panel (PDP), and Field Emission Display (FED) panel.

When the detector 120 detects user biometric information, the first controller 150 may perform an authentication process configured to identify whether the user has an authority to use the vehicle 100 or not, based on the detected biometric information.

Particularly, when the detector 120 detects user biometric information, the first controller 150 may decrypt the user biometric information, which is encrypted and stored in the first storage 140, based on the identification information received from the second storage 170, and then authenticate the user based on whether the detected biometric information is identical to the decrypted biometric information.

The biometric information may include fingerprint information, iris information, and facial information of user, and the identification information may include an encryption key. The first controller 150 may identify whether two kinds of biometric information are identical to each other, based on the singularity of the fingerprint.

As illustrated in FIG. 6, fingerprint has several singularities such as a bifurcation (a1), a core (a2) and a ridge ending (a3). Therefore, the first controller 150 may obtain a singularity of the detected fingerprint and match the singularity with fingerprint information stored in the first storage 140. Accordingly, the first controller 150 may perform the user authentication process depending on whether the singularity is identical to each other.

The singularities shown in FIG. 6 are merely examples, and thus the first controller 150 may identify whether the fingerprint information is identical to each other, based on other singularities.

In addition, when the door 15 is mounted after detached or when the power state of the door 15 connected to the vehicle 100 is changed, the first controller 150 may perform the authentication process to prevent the vehicle theft caused by the detachment of the door 15. When the power state of the door 15 is switched from an Off state to an On state, the first controller 150 perform the authentication process.

Particularly, when the detector 120 detects user biometric information.

The first controller 150 may receive the identification information from the second storage 170, decrypt the user biometric information, which is stored in the first storage 140, based on the identification information received from the second storage 170, and authenticate the user, based on whether the detected biometric information is identical to the decrypted biometric information. When the biometric information is identical to each other, the first controller 150 may identify that the user has the authority to use the vehicle 100, and transmit a result of the authentication to the second controller 200 configured to control the operation of the vehicle 100.

The second controller 200 may control the overall operation of the vehicle 100 and at the same time, give the user the authority to control the vehicle 100. Particularly, when the second controller 200 receives the result that the user has the authority to use the vehicle 100, from the first controller 150, the second controller 200 may give the user the authority to control the vehicle 100.

The first controller 150 and the second controller 200 may be implemented using a memory (not shown) storing an algorithm for controlling an operation of components in the vehicle and data related to programs implementing the algorithm, and a processor (not shown) performing the above mentioned operation using the data stored in the memory. The memory and the processor may be implemented in separate chips, or a single chip.

Figure 7:
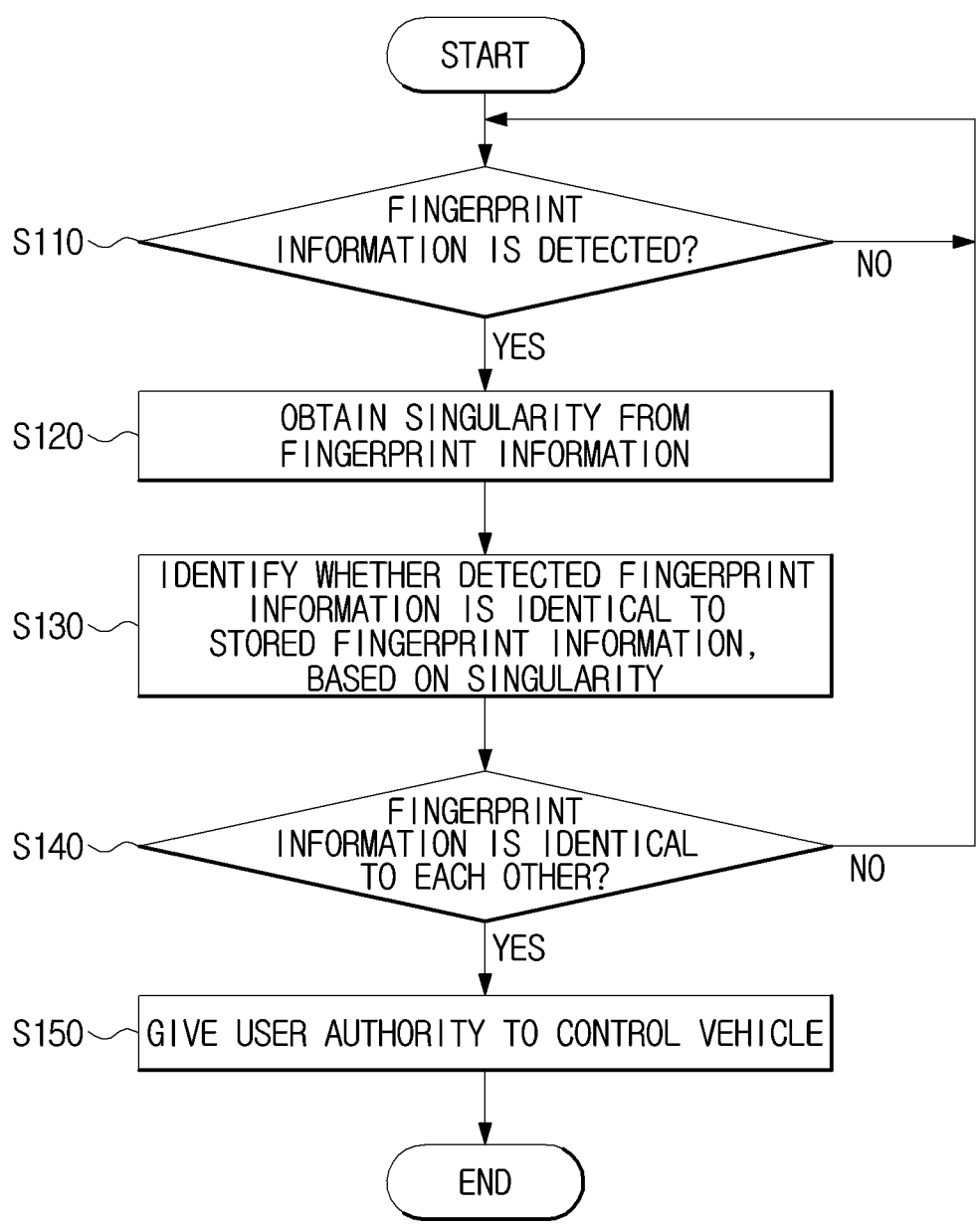
FIG. 7 is a flowchart illustrating a control method of the vehicle.

FIG. 7 is a flowchart illustrating a control method of the vehicle 100 in one form of the present disclosure.

FIG. 7 illustrates fingerprint information as user biometric information, but the user biometric information is not limited to the fingerprint information. Therefore, the biometric information may include various other information of the user.

The vehicle 100 may detect user fingerprint information by using a sensor (S110).

When fingerprint information is detected, the vehicle 100 may obtain a singularity from the detected fingerprint information (S120).

A singularity refers to the unique characteristics of a fingerprint, wherein the singularity may include a bifurcation (a1), a core (a2) and a ridge ending (a3), as illustrated in FIG. 6.

When the vehicle 100 obtains the singularity, the vehicle 100 may match the singularity with fingerprint information stored in the vehicle 100 and identify whether the singularity is identical to a singularity stored in the vehicle 100 (S140).

Particularly, the vehicle 100 may decrypt the fingerprint information stored in the first storage 140, based on the detected fingerprint information and the identification information received from the second storage 170, and then identify whether the decrypted fingerprint information is identical to the detected fingerprint information.

When the decrypted fingerprint information is identical to the detected fingerprint information, the vehicle 100 may identify that a user has an authority to use the vehicle 100, and give the user the authority to control the vehicle 100 (S150).

For example, the vehicle 100 may give the user the authority of opening and locking the door, opening and locking the trunk and turning on and off the ignition of the vehicle 100.

FIG. 8 is a flowchart illustrating a control method of a vehicle 100 in another form of the present disclosure.

A vehicle 100 may detect whether a door 15 is mounted after being detached, or whether the power state of the door 15 connected to the vehicle 100 is changed or not (S210).

Particularly, the vehicle 100 may detect whether the power state of the door 15 is switched from an Off state to an On state.

When the door 15 is mounted after being detached, or when the power state of the door 15 is switched from the Off state to the On state, the vehicle 100 may receive identification information from a second storage 170 since there may be a risk of the vehicle theft (S220).

Particularly, the identification information may include an encryption key, and the vehicle 100 may decrypt the fingerprint information, which is stored in the encrypted state in the first storage 140, by using the encryption key (S230).

When the fingerprint information stored in the first storage 140 is decrypted, the vehicle 100 may receive the decrypted fingerprint information from the first storage 140 and identify whether the fingerprint information, which is detected by the sensor, is identical to the decrypted fingerprint information (S240 and S250).

When two kinds of fingerprint information are identical to each other, the vehicle 100 may identify that the user has the authority to use the vehicle 100, and thus the vehicle 100 may store the detected user fingerprint information in a third storage 160.

Although not shown in the drawings, when the vehicle 100 performs the authentication process after storing the user fingerprint information in the third storage 160, the vehicle 100 may perform the authentication process by matching the detected fingerprint information with the fingerprint information stored in the third storage 160.

Herein the configuration of the vehicle 100 and the control method of the vehicle 100 according to an form have been described.

As for the fingerprint authentication process by storing fingerprint information in the door handle of the vehicle according to the conventional manner, there may be a risk of the vehicle theft caused by the detachment of the door handle.

However, in one form of the present disclosure, since the vehicle 100 decrypts encrypted biometric information by using the identification information, and then performs the user authentication information based on whether the detected biometric information is identical to the decrypted biometric information, it may be possible to inhibit or prevent the vehicle theft, which may occur after the door handle is detached.

Although a few forms of the present disclosure have been shown and described, it would be appreciated by those skilled in the art that changes may be made in these forms without departing from the principles and spirit of the disclosure.

What is claimed is:

1. A vehicle comprising;
a detector configured to detect and obtain biometric information;
a first storage configured to store encrypted user biometric information;
a second storage configured to store identification information of a user; and
a first controller configured to, when the detector detects the biometric information, decrypt the encrypted user biometric information based on the identification information received from the second storage,
wherein authenticating the user by the first controller is initiated when a door of the vehicle is mounted after detached, or when a power state of the door connected to the vehicle is changed, where the first controller is configured to authenticate the user based on whether the detected biometric information is identical to the decrypted user biometric information.

2. The vehicle of claim 1 wherein
the biometric information comprises at least one of fingerprint information, iris information or face information of the user.

3. The vehicle of claim 2, wherein
the identification information comprises an encryption key.

4. The vehicle of claim 2, wherein
the first controller is configured to obtain a singularity from detected user fingerprint information and to determine whether the obtained singularity is identical to decrypted fingerprint information.

5. The vehicle of claim 1, wherein
the first storage comprises a non- volatile memory.

6. The vehicle of claim 1, wherein
when the power state of the door is switched from an Off state to an On state, the first controller is configured to authenticate the user.

7. The vehicle of claim 1, wherein
the detector is provided on at least one of an ignition button, a Fob key, a door handle, a center fascia, or a steering wheel of the vehicle.

8. The vehicle of claim 1, further comprising:
a second controller configured to control an operation of the vehicle,
wherein the second controller is configured to give the user an authority to control the vehicle when the detected biometric information is identical to the decrypted user biometric information.

9. The vehicle of claim 1, further comprising:
a third storage provided with a volatile memory,
wherein the first controller is configured to store the user biometric information in the third storage when the detected biometric information is identical to the decrypted user biometric information.

10. The vehicle of claim 9, wherein
when the detector detects biometric information after first controller stores the user biometric information in the third storage, the first controller is configured to authenticate the user based on whether the detected biometric information is identical to the user biometric information stored in the third storage.

11. A control method of a vehicle comprising the steps of:
storing encrypted user biometric information in a first storage;
storing identification information of a user in a second storage;
detecting and obtaining, by a detector, biometric information;
when the biometric information is detected, decrypting, by a first controller, the encrypted user biometric information based on the identification information received from the second storage; and
authenticating, by the first controller, the user based on whether the detected biometric information is identical to the decrypted user biometric information,
wherein the step of authenticating the user is performed when a door of the vehicle is mounted after detached, or when a power state of the door connected to the vehicle is changed.

12. The control method of claim 11, wherein
the biometric information comprises at least one of fingerprint information, iris information or face information of the user.

13. The control method of claim 12, wherein
the identification information comprises an encryption key.

14. The control method of claim 12, wherein
the authentication of the user comprises the steps of:
obtaining a singularity from detected user fingerprint information, and determining whether the detected user fingerprint information is identical to decrypted fingerprint information based on the obtained singularity.

15. The control method of claim 11, wherein
the first storage comprises a non- volatile memory.

16. The control method of claim 11, wherein
the step of authenticating the user comprises authenticating the user when the power state of the door is switched from an Off state to an On state.

17. The control method of claim 11, wherein
the detection step comprises performing a detection by using at least one of an ignition button, a Fob key, a door handle, a center fascia, or a steering wheel of the vehicle.

18. The control method of claim 11, further comprising:
giving, by a second controller, the user an authority to control the vehicle when the detected biometric information is identical to the decrypted user biometric information.

* * * * *